Jan. 18, 1949.   R. W. MOULTON   2,459,714
PREPARATION OF OXIDES OF MANGANESE
Filed June 10, 1944   2 Sheets-Sheet 1
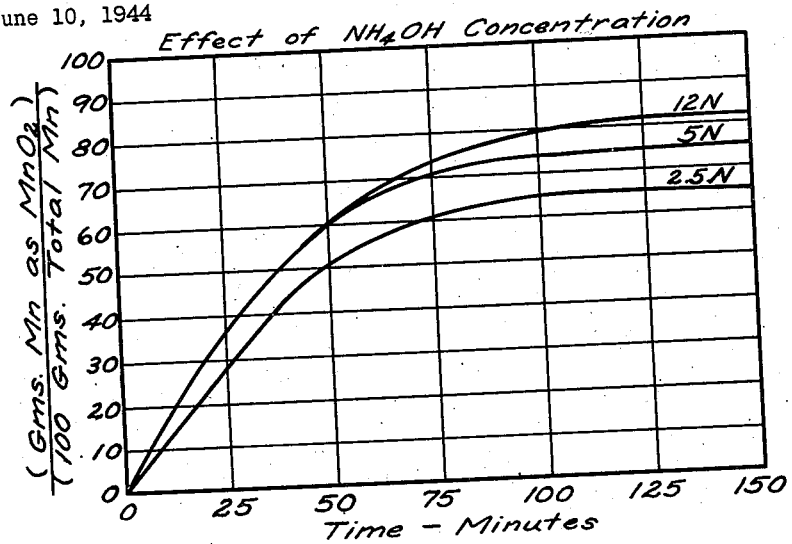
FIGURE I
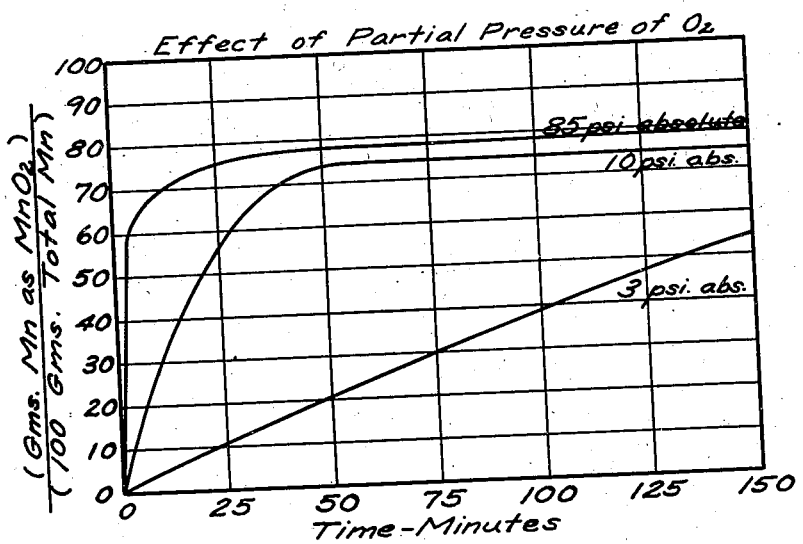
FIGURE II
Inventor
Ralph H. Moulton
By Paul Bliven
Attorney

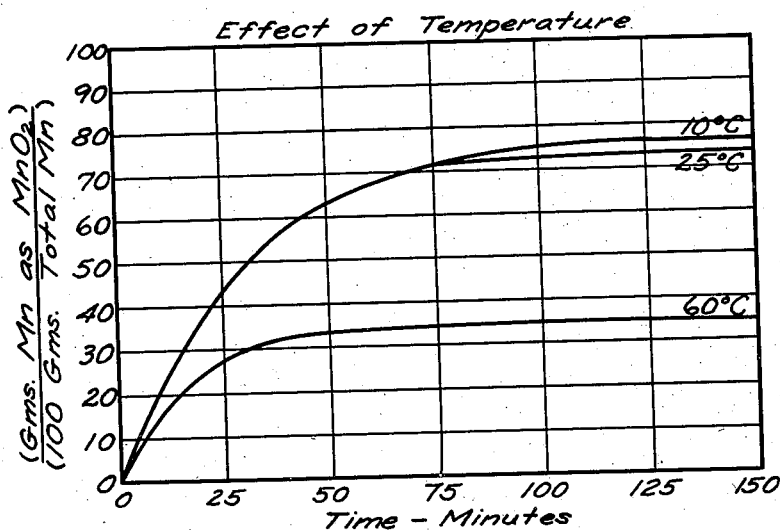
FIGURE III
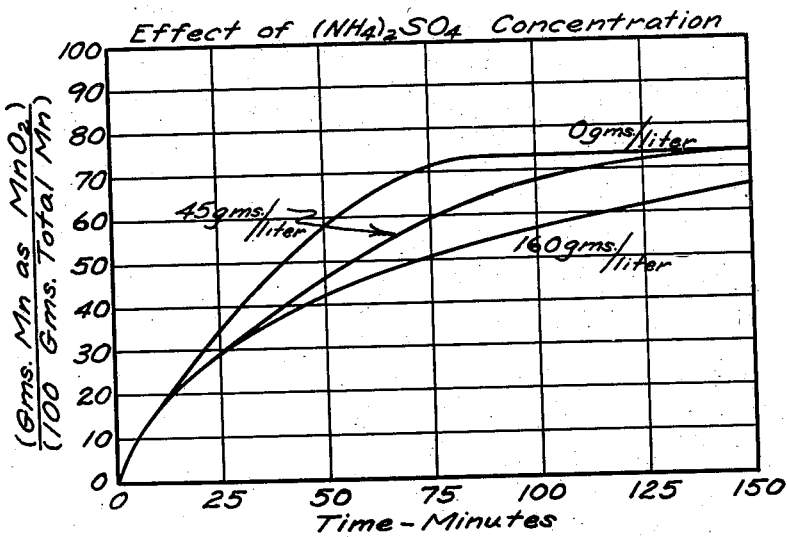
FIGURE IV

Patented Jan. 18, 1949

2,459,714

UNITED STATES PATENT OFFICE 2,459,714

PREPARATION OF OXIDES OF MANGANESE

Ralph W. Moulton, Seattle, Wash., assignor to Manganese Products, Inc., Seattle, Wash., a corporation of Washington Application June 10, 1944, Serial No. 539,685

1 Claim. (Cl. 23—145)

The present invention relates to the preparation of oxides of manganese and, in more particular, to the preparation and precipitation, in from one to two hours, of a product having seventy to eighty per cent, or above, of the manganese as the dioxide from a solution of manganese sulfate.

In the prior art, Bellone 2,122,735, July 5, 1938, states that he can obtain a high percentage of manganese dioxide in twenty-four hours. This is a long time and practically prohibitive of use in an industrial circuit, where large quantities of material must be handled.

Having in mind this defect of the prior art, it is the object of the present invention to precipitate, in from one to two hours, a product having seventy to eighty per cent of the manganese as the dioxide, with the balance as other oxides of manganese.

It has been found that in order to obtain the desired results, the concentration of ammonia must be above 3 N, the partial pressure of oxygen above ten p. s. i. absolute, the concentration of ammonium sulphate below 45 grams per liter, and the temperature below 30° C., all with suitable agitation to provide an intimate mixture of solution and oxygen, as by the use of a spray tower.

The effects of variations in the above critical factors is shown in the accompanying graphs, in which:

Figure I shows the effect of ammonia concentration on oxidation.

Figure II shows the effect of oxygen pressure on oxidation.

Figure III shows the effect of temperature on oxidation.

Figure IV shows the effect of ammonium sulfate concentration on oxidation.

Bellone states that the presence of ammonium sulfate is advantageous to the reaction. This is erroneous as may be seen from Figure IV. From these figures it is easily seen that for a rapid precipitation of a product having a high percentage of the dioxide, the various factors are critical, while for longer periods of precipitation and oxidation, they are not critical, as Bellone states.

In the carrying out of the present invention in a preferred manner, a pressure vessel is provided in which the manganese sulfate solution is placed, and in which the solution may be circulated through a spray head placed in the top of the tank and well above the solution level.

Ammonia is then added to the solution to obtain and maintain a 5 N concentration of ammonia. The concentration of ammonium sulfate in the solution is held below 45 grams per liter. Pure oxygen or air is introduced into the vessel and maintained at a partial pressure of the oxygen above ten p. s. i. absolute. The temperature of the solution is maintained below 30° C., using refrigeration if necessary. The solution and precipitate, as formed, are then circulated through the spray head and tank until precipitation has reached the maximum desired.

In a period of time between one and two hours, it will be found that the manganese is completely precipitated and that seventy to eighty per cent will be in the form of the dioxide.

The example of the equipment given above has been found very effective, but a higher degree of agitation, dispersion, or intermixing of the oxygen with the solution probably will give improved results.

In the graphs shown in the accompanying drawings, there are shown the effects of variation of ammonia concentration, partial pressure of oxygen, of temperature, and of ammonium sulfate concentration. In each of these graphs all other variables but the one under consideration have been held constant at a value close to the optimum as derived from the other graphs. The values used in the preparation of these graphs for all variables being held constant are as follows: Temperature 25° C., partial pressure of oxygen 10 p. s. i. absolute, concentration of ammonia 5 N, and concentration of ammonium sulfate zero grams per liter.

Figure I shows the effect of ammonia concentration on the rate of oxidation of the manganese. This data indicates that there is very little improvement in the amount of oxidation in a given time when the ammonium hydroxide concentration is increased from 5 N to 12 N.

Figure II shows the effect of the partial pressure of oxygen on the rate of oxidation of manganese. The data indicates that there is only a moderate improvement in the amount of oxidation of the manganese in a given time, when the partial pressure of oxygen is increased from ten to eighty-five p. s. i. absolute.

Figure III shows the effect of temperature on the rate of oxidation of manganese. There is very little change in the amount of oxidation between the temperatures of 10° C. and 25° C. A temperature of 60° C. shows markedly inferior rates of oxidation.

Figure IV shows the effect of ammonium sulfate concentration on the rate of oxidation of manganese. These curves show that the ammonium sulfate concentration above 45 grams per liter retards the oxidation of the manganese as precipitated. Ammonium sulfate concentrations of less than 45 grams per liter have only a minor effect on the rate of oxidation. In the operation of the disclosed process, concentrations above 45 grams per liter are not obtained without recirculation of the filtrate, starting with a pure manganese sulfate solution.

Having thus described my invention, I claim:

The process of preparing oxides of manganese, comprising: preparing a solution of manganese sulfate with an ammonium hydroxide concentration above 3 N, subjecting the solution to a partial pressure of oxygen above ten p. s. i. absolute at a temperature below 30° C., and maintaining an ammonium sulfate concentration less than 45 grams per liter.

RALPH W. MOULTON.

REFERENCES CITED

The following references are of record in the file of this patent:

UNITED STATES PATENTS

| Number | Name | Date |
|---|---|---|
| 2,122,735 | Bellone | July 5, 1938 |